United States Patent [19]

Gautier

[11] Patent Number: 5,560,276

[45] Date of Patent: Oct. 1, 1996

[54] MOVABLE WALL FOR A PNEUMATIC BOOSTER

[75] Inventor: Jean Pierre Gautier, Aulnay-Sous-Bois, France

[73] Assignee: AlliedSignal Europe Services Techniques, Drancy, France

[21] Appl. No.: 178,339

[22] PCT Filed: Jan. 7, 1994

[86] PCT No.: PCT/FR94/00023

§ 371 Date: Jul. 31, 1995

§ 102(e) Date: Jul. 31, 1995

[87] PCT Pub. No.: WO94/18042

PCT Pub. Date: Aug. 18, 1994

[30] Foreign Application Priority Data

Feb. 2, 1993 [FR] France ................... 93 01055

[51] Int. Cl.$^6$ ........................................ F15B 9/10

[52] U.S. Cl. ................ 91/376 R; 91/369.2; 92/98 D

[58] Field of Search ................ 91/376 R, 369.1, 91/369.2; 60/547.1; 92/98 D

[56] References Cited

U.S. PATENT DOCUMENTS

| | | | |
|---|---|---|---|
| 3,037,487 | 6/1962 | Brooks | 91/376 R |
| 5,154,106 | 10/1992 | Castel et al. | 91/369.2 |

FOREIGN PATENT DOCUMENTS 1114275  9/1961  Germany ................... 92/98 D

*Primary Examiner*—Thomas E. Denion
*Attorney, Agent, or Firm*—Leo H. McCormick, Jr.

[57] ABSTRACT

A pneumatic booster having a casing (16) formed from a cylinder (32) and a cover (34). The casing (16) is divided into two chambers (18,20) by a movable wall (10). The movable wall. (20) has a plate (12) and a flexible membrane (14). A bead (30) on the outer peripheral edge of flexible membrane (14) is fixed to the casing (16). The flexible membrane (14) forms a fold in a space located between the peripheral edge of the plate (12) and the casing (16). The plate (12) is secured to a hub structure which houses a valve member for operating the pneumatic booster. The plate (12) which is substantially parallel to the end cover has an extension (40) that extends in a forward direction substantially concentric to the cylinder (32). The extension (40) has front part (46) and a rear part (44) with a radial shoulder (42) on the front part. The radial distance (D) between the rear part (44) and the cover (34) is substantially equal to the radial distance between the front cover part (46) and the cylinder (20) minus the thickness of the membrane (14). Thus the movable wall (10) defines a maximum active surface for the development of an operational force in response to the development of a pressure differential upon actuation of the valve member.

6 Claims, 1 Drawing Sheet

MOVABLE WALL FOR A PNEUMATIC BOOSTER

The present invention relates to pneumatic boosters of the vacuum type comprising a casing formed from a cylinder and from a cover and divided into two chambers by a moving wall structure, consisting of a plate and of a flexible membrane fixed by a bead formed on its outer peripheral edge to the casing, and forming a fold in the space located between the plate and the casing, the plate being secured centrally to a hub structure housing a valve means, the plate comprising a forwards extension at its outer edge.

BACKGROUND OF THE INVENTION

Such a booster can be used particularly for boosting the braking of motor vehicles. In this application, the operation of such a booster is well known and can therefore be explained briefly as follows: in the rest phase, the two chambers are connected to a vacuum source; in the braking phase, air at atmospheric pressure is admitted into one of the chambers; the difference in pressure between the two chambers then gives rise to the displacement of the moving wall and consequently boosts the braking.

Document FR-B-2,334,862 describes a pneumatic booster in which a membrane is supported by a rigid plate comprising a cylindrical forwards extension at its outer edge for preventing the membrane, under the effect of the difference in pressure, from deforming towards the center of the booster and from hindering the movement of the plate. With such a design, the diameter of the plate remains limited by the diameter of the rear part of the casing. It follows that the active surface of the moving wall, that is to say the one on which the difference in pressure is exerted, is itself also limited by the rear part of the casing.

SUMMARY OF THE INVENTION

The object of the present invention is to overcome this drawback and to provide a booster in which the active surface of the moving wall is as large as possible.

In order to achieve this goal, according to one characteristic of the invention, the extension comprises a radial shoulder, and the radial distance between the rear part of the extension and the cover is substantially equal to the radial distance between the front part of the extension and the cylinder.

The invention will be better understood and other objects, features and advantages will emerge more clearly from the following description of one embodiment given by way of nonlimiting example with reference to the appended drawings.

DETAILED DESCRIPTION OF THE INVENTION

By convention, the parts of the booster pointing towards the master cylinder are termed the "front" and the parts pointing towards the brake pedal are termed the "rear". Thus, in the figures, the front is to the left and the rear is to the right.

Figure 1:
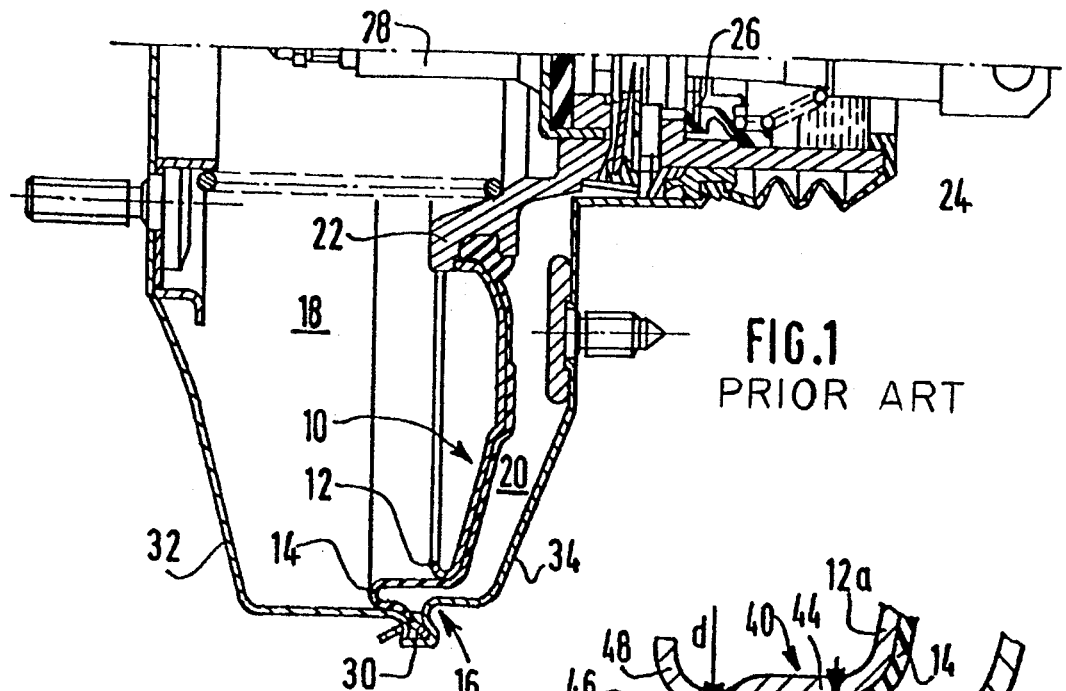
FIG. 1 is a partial view in half-section of a pneumatic booster of the prior art.

FIG. 1 shows, in half-section, a pneumatic brake booster whose main constituent elements and operation are assumed to be known to the person skilled in the art. A moving wall structure 10 formed from an assembly of a metal plate 12 located substantially in a radial plane and of a flexible membrane 14 separates a casing 16 into two chambers 18, 20 inside which different pressures are set up during a braking action so as to bring about the forward displacement of the moving wall 10 and thereby to create the assistance to braking.

In a known fashion, the plate 12 is secured to a hub 22, generally made from plastic, which is combined with an actuating member 24. This actuating member 24 further determines the state of a distribution valve means 26 making it possible to obtain different pressures in the chambers 18 and 20. The hub is also secured to a push rod 28 whose end bears on the input piston of a master cylinder (not shown).

The flexible membrane 14 is fixed by its inner peripheral edge to the metal plate 12 and by its outer peripheral edge to the casing 16, and has a fold allowing it to unroll during the movement of the plate 12.

More precisely, the outer peripheral edge of the membrane 14 forms a bead 30, held captive between a cylinder 32 located at the front and a cover 34 located at the rear and crimped onto the cylinder 32. Conventionally, in order to facilitate this crimping operation, and to ensure that the bead 30 is held and sealed, the diameter of the cylinder 32 is greater than the diameter of the cover 34.

As has been explained above, and as can be seen in FIG. 1, the diameter of the moving wall 10, and in particular of the plate 12, is limited by the diameter of the cover 16 when the booster is in the rest position, all the components occupying their back position, as represented in FIG. 1.

However, when the moving wall 10 is moved forwards during a braking action, the radial distance between the outer edge of the plate 12 and the casing 16 increases by the difference between the diameters of the cylinder 32 and of the cover 34 when the outer edge of the plate 12 passes beyond the bead 30. It therefore follows that in this position, the plate 12 does not have an optimum diameter, and therefore that the booster does not have optimum performance.

In order to overcome this drawback, according to the invention, the plate 12 is formed with a forwards extension 40 at its outer edge 12a, this extension 40 comprising a radial shoulder 42. The shoulder 42 separates the extension 40 into a rear part 44 of smaller diameter and a front part 46 of larger diameter.

The diameter of the front part 46 of the extension 40 is chosen so that the radial distance (d) between this front part 46 and the cylinder 32, minus the thickness of the membrane 14 is substantially equal to the radial distance D between the rear part 44 or the outer edge 12a and the cover 34. Such a configuration allows the membrane 14 to unroll correctly during the movements of the moving wall 10.

In addition, and advantageously, the distance between the shoulder 42 and the outer edge 12a of the plate, or even the axial length of the rear part 44 of the extension 40 is chosen so that in the rest position of the booster, the front part 46 is slightly ahead of the foremost part of the cover 34 in the rear chamber 20, that is to say at least level, in a radial plane, with the bead 30. The front part 46 ends at the front in an inwardly-rounded part 48, so as not to damage the membrane, as is already known. The front part 46 preferably has a limited axial length, so as not to reduce the useful stroke of the moving wall 10 significantly.

Figure 3:
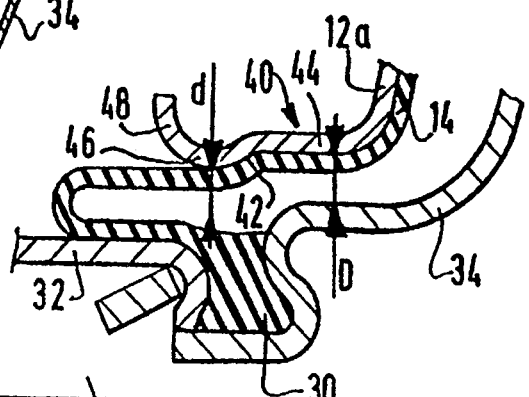
FIG. 3 is an enlarged view of the part III of the booster of FIG. 2.
Figure 2:
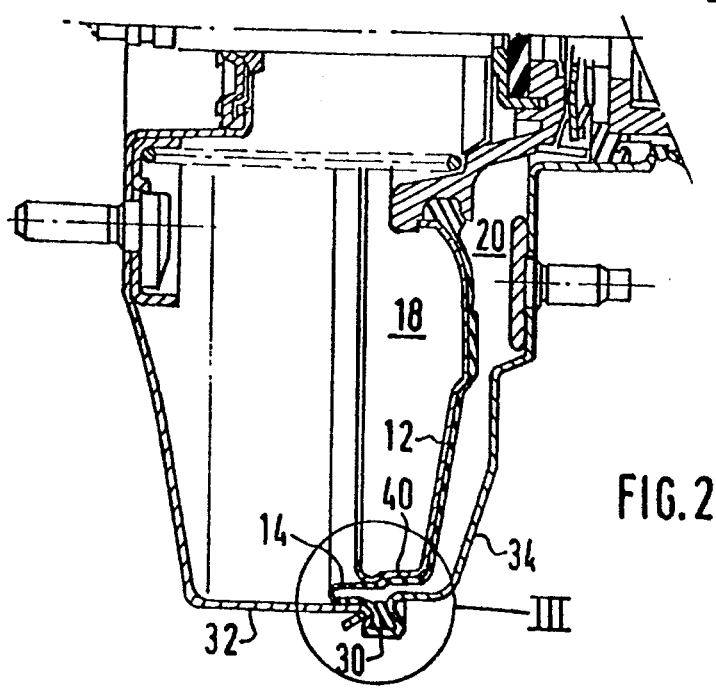
FIG. 2 is a partial view in half-section of a booster produced in accordance with the present invention.

In fact, given that the front part 46 is used to define the active surface of the moving wall 10 only by its maximum diameter, it is possible, and even advantageous during mass production, to produce the front part 46 of rounded shape, with the same radius of curvature as the rounded part 48, and connecting onto the shoulder 42, which may then be inclined with respect to the axis of the booster, as has been shown in FIGS. 2 and 3.

It can therefore be clearly seen that there has been produced, in accordance with the invention, a booster in which the active surface of the moving wall is limited by the diameter of the front part of the casing, that is to say the diameter of the cylinder 32, which is greater than that of the cover 34.

One very important advantage offered by the invention lies in the fact that only the outer edge of the plate 12 of the booster has been changed, all the other components remaining unchanged, and in particular, the casing 16 made up of the cylinder 32 and of the cover 34. This signifies that for the same total bulk it is possible, by virtue of the invention, substantially to improve the performance of the booster by modifying only the plate 12.

Thus, by way of example, comparative tests on boosters of FIGS. 1 and 2 have shown that, with all other factors being the same, namely an input force on the actuating rod 24 of 100 daN, a vacuum of 500 mm Hg in the front chamber 18, and a stroke of the moving wall 10 of 10 mm, the booster of FIG. 1 provides a force of 328 daN on the output rod, whilst the booster of FIG. 2, provides an output force of 339 daN, which represents an improvement of 11 daN, that is approximately 3%, in its performance, which is very noticeable. It is thus possible, by virtue of the invention, to increase the performance of a booster by 3 to 5% by modifying only the plate of the moving wall.

Of course, the invention is not limited to the embodiment which has been described, but is capable of receiving numerous modifications which will be obvious to the person skilled in the art. Thus, for example, the extension 40 may consist of a component attached to the plate 12, instead of being integral with it as has been described. Likewise, in order to prevent making the plate 12 heavier, provision could be made for the extension 40 to be perforated.

I claim:

1. A pneumatic booster of the vacuum type, comprising a casing formed from a cylinder and a cover, said casing being divided into two chambers by a moving wall structure consisting of a plate and a flexible membrane fixed by a bead formed on an outer peripheral edge to the casing and forming a fold in a space located between the plate and the casing, the plate being secured centrally to a hub structure housing valve means, said plate comprising a forward extension at an outer edge, said extension having a front part and a rear part, said front part having a radial shoulder, characterized in that a radial distance between said rear part of the extension and said cover is substantially equal to a radial distance between said front part of the extension and said cylinder, minus the thickness of the membrane.

2. The pneumatic booster according to claim 1, characterized in that in the rest position of the booster the front part of the extension is at least level, in a radial plane, with the bead.

3. The pneumatic booster according to claim 2, characterized in that the front part of the extension has a rounded shape connecting onto the radial shoulder.

4. The pneumatic booster according to claim 3, characterized in that the radial shoulder is inclined with respect to a longitudinal axis of the booster.

5. The pneumatic booster according to one of claims 1–4, characterized in that the extension is a component attached to the plate.

6. The pneumatic booster according to one of claims 1 to 4, characterized in that the extension is integral with the plate.

\* \* \* \* \*